United States Patent Office 3,646,077
Patented Feb. 29, 1972

3,646,077
PROCESS FOR CONTINUOUSLY MANUFACTURING VINYL ESTERS
Gerhard Hübner and Helmut Kainzmaier, Burghausen, Upper Bavaria, Germany, assignors to Wacker-Chemie G.m.b.H., Munich, Bavaria, Germany
No Drawing. Continuation-in-part of application Ser. No. 385,048, July 24, 1964. This application Oct. 23, 1967, Ser. No. 677,063
Claims priority, application Germany, Aug. 5, 1963, W 35,033; Mar. 9, 1964, W 36,351
Int. Cl. C07c *69/24, 69/76;* C11c *3/00*
U.S. Cl. 260—410.9 N          2 Claims

ABSTRACT OF THE DISCLOSURE

This invention relates to the continuous production of vinyl esters, and it has for its object to provide a novel and improved process for this purpose. Another object is to synthesize vinyl esters from acetylene and carboxylic acids having molecular weights in excess of 100, with the use of simple equipment, a marked economy in the use of catalysts, a substantially complete conversion of the acids employed, a space-time yield which is considerably higher than has been obtained heretofore, and without requiring any safeguards to prevent explosions.

CROSS-REFERENCE TO RELATED APPLICATION

This application is a continuation-in-part of application Ser. No. 385,048, filed July 24, 1964, now abandoned.

BACKGROUND OF THE INVENTION

Vinyl esters of carboxylic acids having molecular weights over one hundred have been obtained heretofore by transesterification of the carboxylic acid with vinyl acetate in the presence of mercury or palladium catalysts, by conducting a mixture of carboxylic acid vapors and acetylene at an elevated temperature over activated carbon impregnated with zinc or cadmium acetate; and also by direct synthesis in the liquid phase from carboxylic acid and acetylene in the presence of small quantities of zinc or cadmium salts with the application of elevated temperatures and pressure.

The above processes have decided disadvantages. For instance, transesterification can be considered for the technical manufacture of carboxylic acid-vinyl esters only conditionally, because the vinyl group must be introduced in the form of relatively expensive vinyl acetate. Moreover, the acetic acid created in the process must be recovered by distilling the great excess of vinyl acetate. Also, the catalysts are expensive and, in the case of mercury, also volatile, which necessitates complicated purifying procedures for the carboxylic acid-vinyl ester. Furthermore, the development to a continuous process is difficult.

The vapor phase process requires a complicated pipe still for removing the reaction heat. Moreover, the catalyst must be changed periodically, and expensive activated carbon is required as the catalyst carrier.

On the other hand, the well-known form of synthesis in the liquid phase has the great drawback that technically usable production can be achieved only with the application of high pressures. One tries to avoid the great danger of explosion connected therewith by mixing the acetylene with nitrogen or volatile organic compounds. Because of the necessary pressure resistance and safety measures, the apparatus becomes very expensive. Moreover, the inert materials mixed in must be separated from the reaction product, and it is likewise difficult to achieve continuous production.

SUMMARY OF THE INVENTION

We have now discovered a process for the continuous production of vinyl esters from acetylene and carboxylic acids having molecular weights in excess of 100, in the presence of zinc or cadmium salts, at elevated temperatures and normal pressure, characterized by the fact that for a catalyst we used a melt containing at least 70% of zinc or cadmium salts, and that we work with straight-chain carboxylic acids in the presence of water, with branched carboxylic acids in the absence of water.

In the same volume in which the reaction partners—acetylene and carboxylic acid—are introduced continuously, the vinyl ester is withdrawn from the reaction chamber. This is done either by expulsion at normal pressure with an excess of acetylene, or by continuous separation of the vinyl ester from the reaction mixture which contains vinyl ester, e.g. by distilling in a thin-layer evaporator, and recirculating the residue freed from vinyl ester—into the reaction chamber.

The catalyst melt can be diluted to a small extent with the acid to be transformed or with inert substances. Preferably we work with melts which contain at least 70% zinc or cadmium salts. The usable acids are straight-chained or branched ones, saturated or unsaturated fatty acids, hydroxy acids or single esterified dicarboxylic acids.

DESCRIPTION OF THE PREFERRED EMBODIMENTS

It has been found that when using carboxylic acids of saturated aliphatic monocarboxylic acids branched in the α-position the reaction takes place faster in the absence of water than in the presence of water.

Usable acids of this group are e.g. α-methyl butyric acid, α-ethyl butyric acid, α,α-dimethyl butyric acid, α-methyl valerianic acid, α-ethyl valerianic acid, α-methyl capronic acid, α-ethyl capronic acid. Also, mixtures of saturated tertiary aliphatic carboxylic acids branched in the α-position can be used, where the corresponding zinc salts are used as catalyst. Preferable are those monocarboxylic acids which have been obtained by the transformation of saturated or unsaturated hydrocarbons containing at least 8 C atoms to the molecule—with formic acid or a mixture of carbon monoxide and water. For catalysts one uses the well-known acid catalysts. The mixtures consist largely of molecules where at least two hydrocarbon chains are linked each with at least 2 C atoms with the quaternary or tertiary C atom, to which the carbonyl group is attached. Examples for the preferred configuration are α-methyl-α-ethyl capronic acid and α-methyl-α-propyl capronic acid. These acids are generally known under the term Koch acids and are commercially available, for instance, under the trade name "Versatic acid" (Versatic acid 911 and 1519).

The reaction temperature in producing vinyl esters is limited (that is, the upper temperature) by the disintegration temperature of the zinc or cadmium salts used. Since at lower temperatures the reaction speed is less, it is desirable to work at 10 to 50° C. below the disintegration temperature of the above salts which is about 250° C.

Tests have shown that when vinylizing a mixture of tertiary carboxylic acids with 9, 10 and 11 C atoms (Versatic acid 911) in a liquid phase of which at least 70% consists of zinc salts of those acids, the reaction speed is about two and one-half times greater than when using comparable unbranched carboxylic acids according to the process of the invention. The said Versatic acid may be produced in the manner described in Canadian Pat. No. 673,595, page 14.

It is expedient to use, for carrying out the reaction, the usual equipment for gas/liquid reactions, like mixing retorts, packed columns, bubble cap columns, flow reactors, apparatus with rotary elements, and spray towers.

In the process of the invention, even after 100 hours of operation there is no noticeable decrease in the catalyst's capacity, and the space-time yield, related to the volume of the liquid phase, is more than 300 g./l. per hour when using straight-chain carboxylic acids, and up to 800 g./l. per hour when using aliphatic monocarboxylic acids branched in the α-position, which is much higher than that of known processes. These space-time yields are obtained without using any pressures exceeding the limits of explosion danger (about 1.3 atmospheres). It is therefore possible to work with simple equipment without any elaborate safeguards, and it is not necessary to mix in any inert materials for reducing the danger of explosition. Moreover, one avoids all washing, crystallizing and filtering processes, and contrary to the vapor phase process, the catalyst is revived continuously, so that interruptions in the operation are avoided. Moreover, any preliminary evaporation of the carboxylic acid is superfluous and the reaction heat can be drawn off in a simple manner.

Another advantage of the process of the invention, particularly evident in producing vinyl esters from mixtures, is the possibility of achieving an almost complete transformation of the acids. This eliminates the problems, usually occurring in such cases, of separating the excess acids from the ester mixture, which, due to the extremely close proximity of the boiling points, is more often than not possible only by the neutralization of the acid which in itself causes great losses.

The vinyl esters produced by our process are waterclear, easily movable liquids to wax-like substances which can be polymerized without any particular difficulty, and are of particular interest as components for copolymerization with other vinyl compounds.

EXAMPLE 1

We use a glass tube, melt-sealed at one end, with a diameter of 30 mm. and a length of 450 mm. with a heating coil, a gas input tube down near the bottom, a contact thermometer and a gas-withdrawing tube. The annular space between the gas input tube and the reaction tube is filled with Raschig rings (6 mm. diameter) and with 150 ml. of a mixture of 80% zinc laurate and 20% lauric acid. 130–150 liters/h. at about 20° C. of acetylene saturated with water are fed for 10 hours through the liquid phase which has been heated to 220° C. At the same time 50 g. per hour of lauric acid are fed through the gas input tube into the reaction chamber. From the escaping gas mixture the condensable parts are separated in a U-shaped air-cooled separator filled with Raschig rings. The condensate yield per hour is 46 g. vinyl laurate and 8 g. lauric acid, which is equal to a space-time yield, referred to the catalyst melt, of 306 g./l. per hour and a yield, related to lauric acid, of 98% of theory.

Against this, however, under the conditions stated, for instance, in Reppe Pat. No. 2,066,075, when using the same apparatus in the continuous work method and without the use of excess pressure, only 20 g. of vinyl laurate/l. liquid phase is produced per hour; the space-time yield of the process of the present invention therefore is 15 times greater.

EXAMPLE 2

We proceed as in Example 1, but pure molten zinc laurate is used as a catalyst.

The result is an average of 41.7 g. vinyl laurate/h. at an input of 50.1 g. lauric acid and 155 liters acetylene/h., and 12.4 g./h. of lauric acid are recovered. Yield: 98.0% of theory, related to lauric acid.

However, if one work under the same conditions with dry acetylene, i.e. in the absence of water, then the liquid phase enriches itself per hour with about 20 g. of high-boiling products and the reaction speed drops considerably after a few hours.

EXAMPLE 3

One proceeds as in Example 1, but the catalyst consists of 75% zinc laurate and 25% paraffin oil. The acid input per hour is 44.5 g. and the yield per hour is 36.1 g. vinyl laurate and 12.1 g. lauric acid. This is equivalent to a yield of 98.7%.

EXAMPLE 4

In the same manner as in Example 1 the acids shown below are transformed; in all cases the pure zinc salts of the acids involved were used as catalysts in molten state. The results are shown in the table below:

|  | G./h. pure ester | Space-time yield, g./l. hour |
| --- | --- | --- |
| Diethyl acetic acid | 18 | 120 |
| Capric acid | 33.5 | 223 |
| Myristic acid | 47.5 | 317 |

EXAMPLE 5

One proceeds as in Example 1, but the catalyst is cadmium laurate instead of zinc laurate. When adding 50 g./h. lauric acid, 40 g./h. vinyl laurate are obtained.

EXAMPLE 6

The apparatus used is the same as in Example 1, but with added dosaging and discharging devices at the head and at the bottom of the reaction vessel.

The liquid phase, consisting of molten zinc stearate, is exchanged once every hour by withdrawal at the foot of the tower and corresponding input at the tower's head. Acetylene is fed in at the bottom. The stearic acid to be transformed, 30 g./h. drips in at the top. From the withdrawn liquid phase the ester is obtained with part of the untransformed acid by vacuum distillation. Result: 25 g./h. vinyl stearate, 6.5 g./h. stearic acid were recovered. Yield 97.3%.

EXAMPLE 7

We work in the same way as in Example 6. However, the catalyst melt consists of 80% zinc arachimate and 20% arachic acid. Every hour 21 g. of vinyl arachinate are formed.

EXAMPLE 8

Conditions similar to Example 1 are employed, but instead of pure lauric acid every hour we add 45 g. of a mixture of 30% capric acid and 70% lauric acid. There are obtained 45 g. of the corresponding vinyl ester mixture and 2 g. of the untransformed acid.

EXAMPLE 9

We use a glass tube, melt-sealed at one end, with a diameter of 31 mm. and a length of 600 mm., equipped with a heater coil, a gas input tube near the bottom, a contact thermometer and a gas withdrawal tube. The annular space between the gas input tube and the reaction tube is filled with Raschig rings (4 mm. diameter) and with 200 ml. of the zinc salt of an acid mixture which is known by the trade-name of "Versatic acid 911." Every hour 120 liters of acetylene are fed through the catalyst melt which has been heated to 220° C., and at the same time 163 g. of "Versatic acid 911" are fed through the gas input tube. From the withdrawn gas mixture the condensable parts are separated in a U-shaped air-cooled separator filled with Raschig rings. The condensate yield per hour is 166 g. vinyl ester and 18 g. versatic acid. This is equivalent to a space-time yield of 830 g./ltr. catalyst hour, a yield of 99.4% related to the acid transformed, and an acid transformation of 89%.

EXAMPLE 10

We work in the same manner as in Example 9, but the catalyst melt contains 20% "Versatic acid 911" and 80% zinc salt of this acid. The throughput of acid is 65 g./h. The condensate obtained per hour is 73 g. vinyl ester and 1 g. acid. This is equivalent to a space-time yield, related to the volume of the melt of 365 g./ltr. hour, and acid transformation of 98.5% and a yield of 99%, related to the acid transformed.

EXAMPLE 11

The same apparatus is used as in Example 9, but we use 40 ml. of "Versatic acid 1519," i.e. a mixture of tertiary carboxylic acids with 15, 16, 17, 18 and 19 C atoms, and 160 ml. of molten zinc salt of this acid. The reaction temperature is 230° C., the throughput of acetylene is 410 l./h. and the input of "Versatic acid 1519" is 66 g./h. The condensate obtained per hour is 68 g. vinyl ester and 4 g. of untransformed acid, which is equivalent to a space-time yield, related to the volume of the melt, of 340 g./ltr. hour, an acid transformation of 94% and a yield of 97.2% related to the acid transformed.

EXAMPLE 12

The apparatus as per Example 9 is used, but filled with 40 ml. α-ethyl butyric acid and 160 ml. of the zinc salt of α-ethyl butyric acid. Every hour 47 l. acetylene and 66 g. α-ethyl butyric acid are fed through the catalyst melt which has been heated to 220° C. The condensate obtained is 27 g. of α-ethyl butyric acid-vinyl ester and 41 g. of α-ethyl butyric acid. This is equivalent to a space-time yield, related to the volume of the catalyst melt of 135 g./ltr. hour, an acid transformation of 39% and a yield of 88.2%, related to the acid transformed.

EXAMPLE 13

The same apparatus as in Example 9 is used. The catalyst melt consists of 40 ml. α-ethyl capronic acid and 160 ml. zinc ethyl capronate. Every hour 40 l. acetylene and 50 g. ethyl capronic acid are fed through the catalyst melt which has been heated to 220° C. The condensate obtained is 30 g. of ethyl capronic acid-vinyl ester and 23 g. of ethyl capronic acid. This is equivalent to a space-time yield, related to the volume of the melt, of 150 g./ltr. hour, an acid transformation of 54% and a yield of 94%, related to the acid transformed.

EXAMPLE 14

The same apparatus is used as in Example 9. The catalyst melt consists of 40 ml. α-phenyl butyric acid and 160 ml. of the zinc salt of this acid. 72 g. α-phenyl butyric acid and 150 l. of acetylene are fed per hour through the melt which has been heated to 220° C. The condensate obtained per hour is 81 g. of α-phenyl butyric acid-vinyl ester and 9 g. of α-phenyl butyric acid.

The invention claimed is:

1. Process for continuously manufacturing vinyl esters from acetylene and straight-chain monocarboxylic acids of molecular weights of more than 100, which comprises reacting the acetylene and carboxylic acid at a temperature of 200–240° C. and normal pressure in the presence of water and of a catalyst melt which contains at least 70% of a member selected from the group consisting of zinc and cadmium salts.

2. Process according to claim 1, characterized by the fact that the quantity of water is such as is contained in water-vapor saturated acetylene at about 20° C.

References Cited

UNITED STATES PATENTS 2,066,075  12/1936  Reppe _____ 260—410.9

LORRARINE A. WEINBERGER, Primary Examiner

R. S. WEISSBERG, Assistant Examiner

U.S. Cl. X.R.

260—476 R, 488 H, 498